(12) United States Patent
Chen et al.

(10) Patent No.: US 9,984,326 B1
(45) Date of Patent: May 29, 2018

(54) SPIKING NEURAL NETWORK SIMULATOR FOR IMAGE AND VIDEO PROCESSING

(71) Applicant: HRL Laboratories, LLC, Malibu, CA (US)

(72) Inventors: Yang Chen, Westlake Village, CA (US); Yongqiang Cao, Newton, MA (US); Deepak Khosla, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 262 days.

(21) Appl. No.: 14/680,057

(22) Filed: Apr. 6, 2015

(51) Int. Cl.
*G06K 9/62* (2006.01)
*G06N 3/10* (2006.01)
*G06N 3/08* (2006.01)

(52) U.S. Cl.
CPC ............... *G06N 3/10* (2013.01); *G06K 9/62* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 8,160,354 B2* | 4/2012 | Paquier | G06K 9/4623 382/155 |
| 9,346,167 B2* | 5/2016 | O'Connor | G06N 3/008 |
| 2003/0002731 A1* | 1/2003 | Wersing | G06K 9/4628 382/161 |
| 2008/0201282 A1* | 8/2008 | Garcia | G06K 9/00281 706/20 |
| 2015/0269485 A1* | 9/2015 | Julian | G06N 3/084 706/25 |
| 2016/0034812 A1* | 2/2016 | Gibson | G06N 3/08 706/25 |

OTHER PUBLICATIONS

Evolving spiking neural networks: A survey, Stefan Schliebs et al., Evolving systems, DOI: 10.1007/s12530-013-9074-9, Jun. 2013, pp. 1-12.*
Evolving spiking neural networks: A survey, Stefan Schliebs et al., Evolving systems, DOI: 10.1007/si 2530-013-9074-9, Jun. 2013, pp. 1-12.*
Artificial Neural image processing applications: A survey, Quintana et al., Advance online publication, 2012, pp. 1-13.*
Image processing with spiking Neuron Networks, Meftah et al., Springer, SCI 427, 2012, pp. 525-544.*

(Continued)

*Primary Examiner* — Jayesh A Patel
(74) *Attorney, Agent, or Firm* — Tope-McKay & Associates

(57) ABSTRACT

Described is system for simulating spiking neural networks for image and video processing. The system processes an image with a spiking neural network simulator having a plurality of inter-connected modules. Each module comprises a plurality of neuron elements. Processing the image further comprises performing a neuron state update for each module, that includes aggregating input spikes and updating neuron membrane potentials, and performing spike propagation for each module, which includes transferring spikes generated in a current time step. Finally, an analysis result is output.

21 Claims, 10 Drawing Sheets

(56) References Cited

OTHER PUBLICATIONS

Evolving spiking neural networks: A survey, Stefan Schliebs et al., Evolving systems, DOI: 10.1007/si 2530-013-9074-9, Jun. 2.*
Balduzzi, David, and Giulio Tononi. "What can neurons do for their brain? Communicate selectivity with bursts," Theory in Biosciences 132.1 (2013), pp. 27-39.
Nere, Andrew, et al. "A neuromorphic architecture for object recognition and motion anticipation using burst-STDP." PloS one 7.5 (2012), pp. e36958.
Dan Y, Poo MM (2004) Spike timing-dependent plasticity of neural circuits. Neuron 44, pp. 23-30.
Brette, et Al. "Simulation of networks of spiking neurons: A review of tools and strategies," J Comput Neurosci, (2007), pp. 1-50, DOI 10.1007/s10827-007-0038-6.
Laurent Itti, Christof Koch, "A saliency-based search mechanism for overt and covert shifts of visual attention," Vision Research, 40 (10), pp. 1489-1506, (2000).
Hassenstein, B., and Reichardt, W. (1956). Systemtheoretische Analyse der Zeit-, Reihenfolgen- und Vorzeichenauswertung bei der Bewegungsperzeption des Rüsselkäfers Chlorophanus. Z Naturforsch IIb, pp. 513-524.
Reichardt, W. (1961). Autocorrelation, a principle for the evaluation of sensory information by the central nervous system. In Sensory Communication, W.A. Rosenblith, ed. (New York, London: MIT Press and Wiley), pp. 303-317.
Haag, J., Denk, W., & Borst, A. (2004). Fly motion vision is based on Reichardt detectors regardless of the signal-to-noise ratio. Proceedings of the National Academy of Sciences of the United States of America, 101(46), pp. 16333-16338.
Reid R. Harrison and Christof Koch (1998) An Analog VLSI Model of the Fly Elementary Motion Detector. In Advances in Neural Information Processing Systems 10, M. I. Jordan, M. J. Kearns, S.A. Solla, eds. MIT Press, Cambridge, MA, pp. 880-886.
Energy-Efficient Neuron, Synapse and STDP Integrated Circuits, Jose M. Cruz-Albrecht, Michael W. Yung, Narayan Srinivasa, IEEE Trans. Biomed. Circuits Sys., vol. 6, No. 3, Jun. 2012, pp. 246-256.
Energy Efficiency of FPGAs and Programmable Processors for Matrix Multiplication, Scrofano, Choi and Prasanna. Proceedings Field-Programmable Technology, 2002. (FPT), pp. 422-425.
Badia, S.B.I., Pyk, P., & Verschure, P. F. (2007). A fly-locust based neuronal control system applied to an unmanned aerial vehicle: the invertebrate neuronal principles for course stabilization, altitude control and collision avoidance. The International Journal of Robotics Research, 26(7), pp. 759-772.
Meng, H., Appiah, K., Yue, S., Hunter, A., Hobden, M., Priestley, N., Hobden, P. & Pettit, C. (2010). A modified model for the Lobula Giant Movement Detector and its FPGA implementation. Computer vision and image understanding, 114(11), pp. 1238-1247.
Yue, S., & Rind, F. C. (2012). Visually stimulated motor control for a robot with a pair of LGMD visual neural networks. International Journal of Advanced Mechatronic Systems, 4(5), pp. 237-247.
O'Shea, M. & Williams, J. L. D. (1974). The anatomy and output connection of a locust visual interneurone; the lobular giant movement detector (LGMD) neurone. Journal of comparative physiology, 91(3), pp. 257-266.
Judge, S., & Rind, F. (1997). The locust DCMD, a movement-detecting neurone tightly tuned to collision trajectories. The Journal of experimental biology,200 (16), pp. 2209-2216.
Itti, L., Koch, K, and Niebur, E. (1998). A model of saliency-based visual attention for rapid scene analysis. IEEE Trans. on Pattern Analysis and Machine Intelligence, 20(11), pp. 1254-1259.
Itti, L. and Koch, K. (2000). A saliency-based search mechanism for overt and covert shifts of visual attention, , in Vision Research, 40, pp. 1489-1506.
Cruz-Albrecht, et al. (2012) "Energy efficient neuron, synapse and STDP integrated circuits" in IEEE Transactions on Biomedical Circuits and Systems, 6(3), pp. 246-256.
Merolla et. al (2014) "A million spiking-neuron integrated circuit with a scalable communication network and interface" in Science, vol. 345, Issue 6197, pp. 668-673.
Jacques Gautrais and Simon Thorpe in "Rate Coding Versus Temporal Order Coding: a Theoretical Approach," in Biosystems vol. 48, Issues 1-3, Nov. 1, 1998, pp. 57-65.

* cited by examiner

SPIKING NEURAL NETWORK SIMULATOR FOR IMAGE AND VIDEO PROCESSING

GOVERNMENT LICENSE RIGHTS

This invention was made with government support under U.S. Government Contract Number Contract # W31 P4Q-08-C-0264 awarded by DARPA. The government has certain rights in the invention.

FIELD OF INVENTION

The present invention relates to a system for spiking neural network simulation and, more particularly, to a system for spiking neural network simulation which reduces burdens of both memory and computation.

BACKGROUND OF THE INVENTION

Prevalent methods for spiking neural network simulation are neuron based, such as the method described in Literature Reference No. 1 in the List of Incorporated Literature References. There is a long-held belief that a spike neural network is limited by how fast one can simulate spike communication in synapses. Traditional research on large scale spiking neural networks focuses on general-purpose simulation, such as simulating a specific brain function within a population or populations of neurons. The research emphasizes bio-fidelity and computational efficiency of the neuron models, but still maintains maximum flexibility, which neuron-based methods provide. Memory and communication are two important bottlenecks that these simulation methods encounter in scaling up the size of the network they can simulate.

Furthermore, large scale simulations of spiking neural networks were not possible until recently with the introduction of high density computer clusters using commodity computer processors. Applications to solving real life problems (such as computer vision) are still unreachable due, in part, to the size of neuron populations required for simulation in such applications. Previous neuron-oriented simulation methods have memory complexity that is linear in the number of synapses for neurons. Additionally, previous methods involve inter-neuron communication.

Thus, a continuing need exists for a system that enables efficient simulation of spiking neural networks that can scale to very large networks with the least hardware restriction.

SUMMARY OF THE INVENTION

The present invention relates to a system for spiking neural network simulation and, more particularly, to a system for spiking neural network simulation which reduces burdens of both memory and computation. The system comprises one or more processors and a memory having instructions such that when the instructions are executed, the one or more processors perform multiple operations. The system processes an image with a spiking neural network simulator having a plurality of inter-connected modules, each module comprising a plurality of neuron elements. Processing the image further comprises performing a neuron state update for each module that includes aggregating input spikes and updating neuron membrane potentials; and performing spike propagation for each module that includes transferring spikes generated in a current time step. An analysis result is output.

In another aspect, processing the image comprises, based on a type of a task to be performed on the image, determining whether to perform the processing using one of a matrix having at least four dimensions and a matrix having two or less dimensions; and performing the task on the image using one of the matrix having at least four dimensions and the matrix having two or less dimensions.

In another aspect, wherein the matrix having at least four dimensions denotes synaptic connections and weights between a plurality of neuron elements of a source module and a current module in the plurality of inter-connected modules.

In another aspect, the matrix having two or less dimensions is configured to perform a convolution.

In another aspect, at least one buffer is associated with each module, and the spike propagation steps comprise updating the at least one buffer of a current module using the at least one buffer of a source module.

In another aspect, wherein processing the image further comprises changing the weights for the matrix having at least four dimensions of at least one of the modules when learning occurs.

In another aspect, the spike propagation steps between modules located on the same computer environment are performed by assigning pointers.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
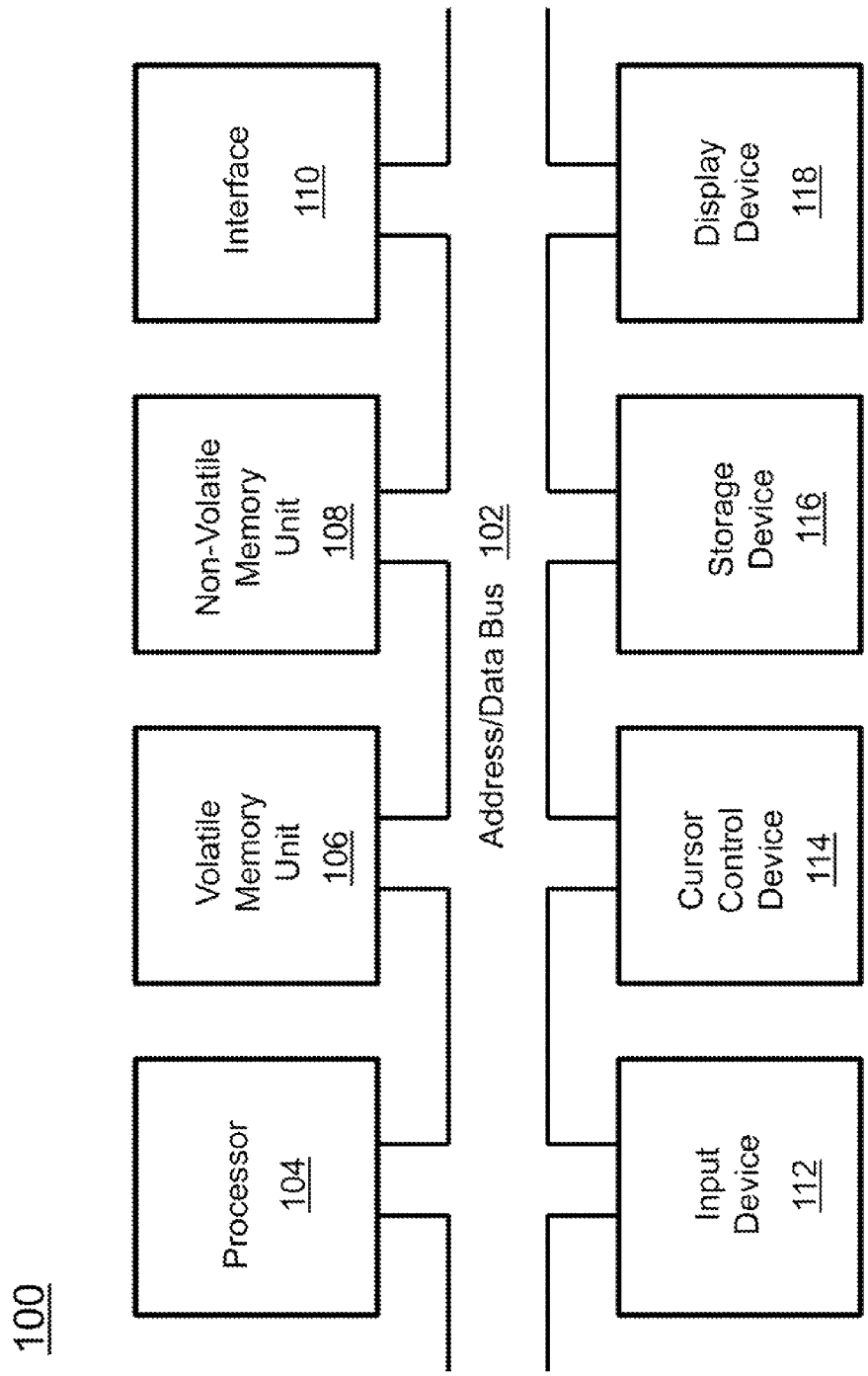
FIG. 1 is a block diagram depicting the components of a system for using a spiking neural network simulator for image processing according to the principles of the present invention.

The present invention relates to a system for spiking neural network simulation and, more particularly, to a system for spiking neural network simulation which reduces burdens of both memory and computation. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Brette, Romain, et al. "Simulation of networks of spiking neurons: a review of tools and strategies." Journal of computational neuroscience 23.3 (2007): 349-398.
2. Dan Y, Poo M M (2004) Spike timing-dependent plasticity of neural circuits. Neuron 44: 23-30.
3. Balduzzi, David, and Giulio Tononi. "What can neurons do for their brain? Communicate selectivity with bursts." Theory in Biosciences 132.1 (2013): 27-39.
4. Nere, Andrew, et al. "A neuromorphic architecture for object recognition and motion anticipation using burst-STDP." PloS one 7.5 (2012): e36958.
5. Itti, Laurent, and Christof Koch. "A saliency-based search mechanism for overt and covert shifts of visual attention." Vision research 40.10 (2000): 1489-1506.

(2) Principal Aspects

The present invention has three "principal" aspects. The first is a system for spiking neural network simulation. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as the user interface, a camera and/or radar (depicted in FIG. 3 as elements 302 and 300, respectively), or any combination of devices that provide the functionalities as described herein. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
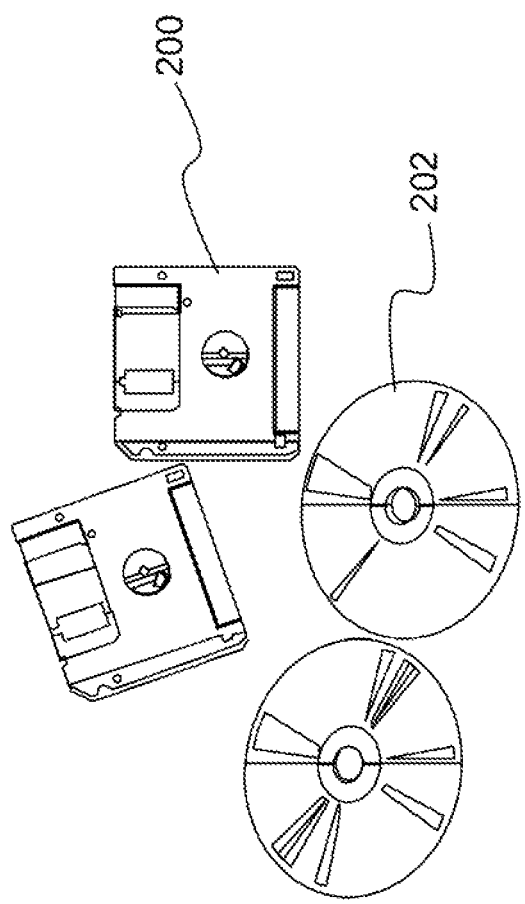
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The system according to the principles of the present invention provides a unified framework and interface for spiking neural network simulations for video and image processing. Video and image processing tasks are highly structured, and most operations are image based. That is, each basic operation in image and video processing can be modeled as an image with some operations applied uniformly across the entire image (e.g., in convolution or filtering). The present invention is module-based with each module representing such basic operations with an input, result (intermediate), or output image, which is significantly distinct from single neuron-based design. The system described herein simplifies spiking neural network simulations for video and image processing in various computer vision processes (e.g., convolution, filtering) and complex tasks (e.g., saliency detection, motion detection, learning and recognition) and enables efficient simulation of spiking neural network for research and applications alike.

(4) Specific Details of the Invention

In an artificial neural network, simple artificial nodes, known as "neurons", "processing elements" or "neuron elements", are connected together to form a network which mimics a biological neural network. The system according to the principles of the present invention is defined as a collection of inter-connected modules. Each module can have any number of neurons (or neuron elements). These modules can connect with each other with arbitrarily defined feed-forward and/or feedback connections (including connections among the neurons in the same module).

A module according to the principles of the present invention is the data structure plus the processes performed (e.g., spike propagation and neuron state updates, described below). The data structures and processes can be implemented in hardware. In a desired aspect, a spiking neural network chip is a non-limiting example of a hardware type used in the present invention. It is more efficient (in terms of the amount of data to be communicated between hardware chips) if a module is implemented within one such spiking neural network chip (or a group of co-located chips). This way, there is a one-to-one correspondence of the network design (such as the one depicted in FIG. 3) and hardware implementation (i.e., one module per chip or several chips). On the software simulation side, it is desirable to implement each module on a single computer process node. For a very large network simulation, one can have the network broken down into groups of modules with each group hosted on a single processor node across a cluster of computers.

The system according to the principles of the present invention is designed to simulate physical neuron behaviors in the brain so as to allow processing of information (such as visual input in the form of a digital image) in software in much the same way as human brains do it. In a typical simulated spiking neural network, each neuron in the network is connected to other neurons in the network in two ways. A neuron receives inputs from one or more other neurons, and it delivers output to one or more other neurons in the network (these neurons receive the same input from said neuron with possibly different amount of "axon delay" in time). The input and output of the neurons are measured in "spikes" typically represented as 1's and with 0's representing the resting (non-active or no-spike) state. In simulating a spiking network, typically the system works in discrete time steps (e.g., one milli-second (ms) each), in which each neuron samples the input from its input connections, calculates its own internal states, and determines if it should "fire". If the neuron fires, it produces a "spike" (output "1") and delivers it to all of the neurons connected to this neuron's output connections. Otherwise, its output remains at 0. The neuron will then update its internal states accordingly. The output values from this neuron will be sampled by neurons receiving input from this neuron in the next simulation time step (subject to additional "axon delay" if defined).

In a typical spiking neural network simulation, a set of neurons are chosen as input neurons to receive input spikes from an external source (such as one generating spikes from an image, or image frames from a video sequence), and another set are chosen to be the output neurons whose output are gathered and analyzed to reach the desired processing results. The system according to the principles of the present invention is ideal for image and video processing in which the neurons are organized in layers much the same way as neurons in human brains. Therefore, there is an input layer, one or more middle layers (often referred to as hidden layers since one cannot "see" them or get to their activities directly), and an output layer. These layers are implemented and described as "modules" in the present invention. This organization, coupled with two-dimensional (2D) operations, such as convolution and filtering, makes the present invention far more efficient in computation time and memory compared with other spike simulation approaches.

To carry out the simulation, the system described herein repeats the following two steps in each simulation time step (typically equal to one millisecond of actual time): a neuron state update step and a spike propagation step. In the neuron state update step, the neurons in each layer aggregate input spikes, update neuron membrane potentials according to certain mathematical models, and generate spikes if conditions are met for each individual neuron. In the spike propagation step, the neurons in each layer fetch (e.g., transfer) spikes generated in the current time step from their feeder layers in preparation for the update step in the next simulation cycle. Since the system is organized into layers, one can carry out all neuron state updates in parallel in time in all layers, followed by spike propagation between all layers in parallel in time.

Another key feature in the present invention is that the design of the simulation framework and the structures supporting the simulation allow one to carry out simulation (both the neuron state update step and the spike propagation step) more efficiently in turns of time and memory space usage. The details of the simulation framework and the structures are described starting in Section 4.1 below, and the neuron state update step and the spike propagation step are described starting in Section 4.6 below.

Figure 3:
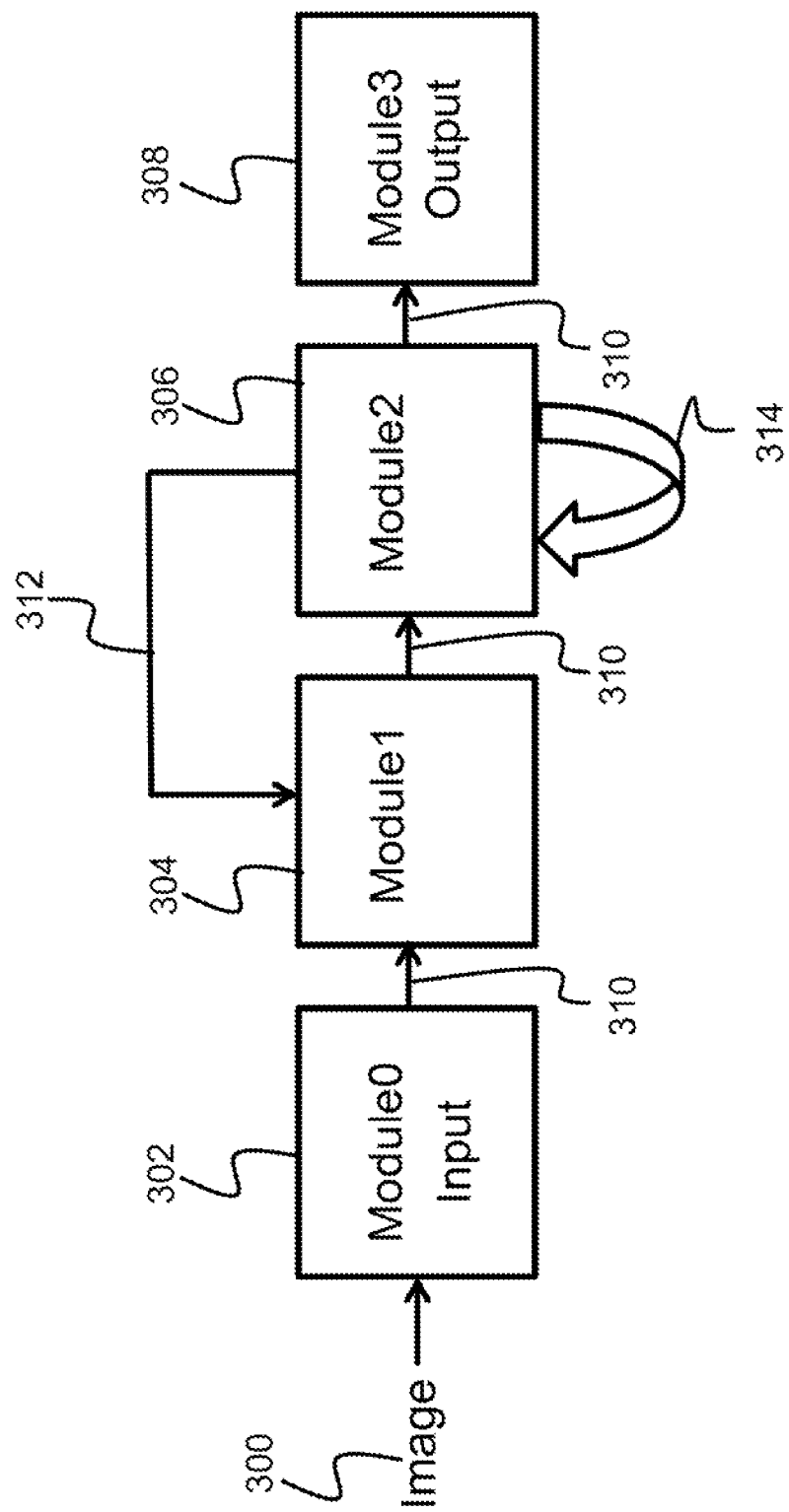
FIG. 3 is an illustration of a spiking neural network defined by modules and interconnections according to the principles of the present invention.

FIG. 3 is an example of a spiking neural network defined by an input image 300 and multiple modules (e.g., module0 input 302, module1 304, module2 306, module3 output 308) with feedforward 310 and feedback 312 connections. For instance, a human visual system is a layered structure, from retina via lateral geniculate nucleus (LGN), primary visual cortex, extrastriate cortex to inferior temporal (IT) cortex. In this non-limiting example, each layer can consist of one module in a spiking neural network (SNN) simulator. The module3 output 308 is an analysis result, such as a processed image or image classification results.

Figure 4:
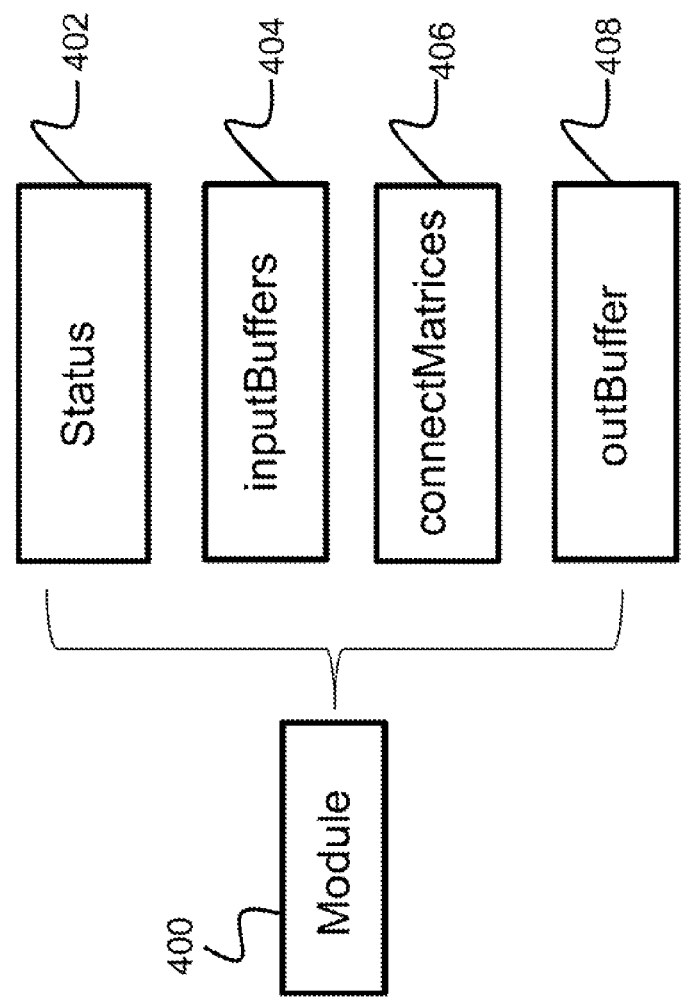
FIG. 4 is an illustration of a module structure according to the principles of the present invention.

As illustrated in FIG. 4, each SNN module 400 (302, 304, 306, or 308) comprises the following components: status, input spike buffers, connection matrices, and an output spike buffer. As illustrated in FIG. 4, the SNN module 400 can be implemented as a structure with fields corresponding to the components: status 402, inputBuffers 404, connectMatrices 406, and outBuffer 408.

(4.1) Module Status

Figure 5:
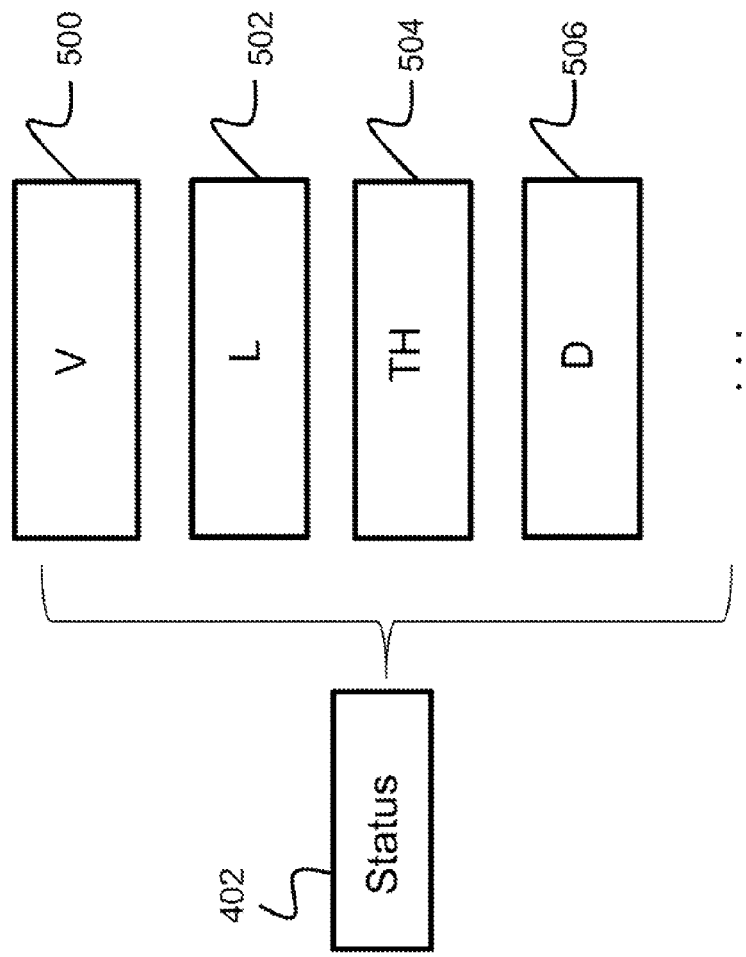
FIG. 5 is an illustration of a module status structure according to the principles of the present invention.

The core of each module (302, 304, 306, or 308) is the set of neurons the module (302, 304, 306, or 308) represents, including the dynamics of the neurons as governed by the mathematic model of the neurons, and its interactions to other neurons in other modules (302, 304, 306, or 308), including the input and output. The status 402 component, together with the neuron model (Equation (1)), are used to model and represent the dynamics of the neurons in a module. The status 402 stores the states of neurons in the SNN module 400. For an integrate-and-fire type neuron, for example, it can include, but is not limited to, membrane potential, leakage, firing threshold, and the length of an output spike buffer for keeping a certain history of spikes for axonal delay. More complex neurons can use a completely different set of variables to keep track of the status 402. Therefore, the module status 402 is also a structure with its own fields. For example, consider an integrate-and-fire neuron, with a membrane potential equation defined as follows:

$$V_{ij}(t+1) = V_{ij}(t) + L_{ij} + \Sigma_{pq} A_{pq}(t) W_{pqij}. \quad (1)$$

where $V_{ij}$ represents the membrane potential and $L_{ij}$ the leakage for neuron located at (i,j), respectively; $A_{pq}$ is the content of an input spike buffer at location (p,q), $W_{pqij}$ is a connection weight for spikes from location (p,q) to neuron at (i,j). Equation (1) allows one to compute the membrane potential V at time t+1 given the membrane potential at time t, the leakage, the input spikes, and the connection weights for the input. A secondary step which is not spelled out in Equation (1) but is necessary in carrying out spiking neuron simulation is that, once V(t+1) is computed, it is compared to a threshold (denoted TH below). If V(t+1) is equal to or greater than TH, then the neuron will produce a spike (a "1") in the simulation, and have its membrane potential reset (i.e., V(t+1)=0, where 0 is a typical resting potential to use). Otherwise, the neuron will keep the potential as computed according to Equation (1). Given this example, depicted in FIG. 5, module status 402 comprises the following fields: V 500 (membrane potentials of module neurons, a two-dimensional (2D) matrix for image or video processing), L 502 (leakage parameter, a 2D matrix or a scalar number), TH 504 (firing threshold, a 2D matrix or scalar number), and D 506 (a scalar for the buffer length of module outBuffer 408 for holding spikes with various amount of delays). For the leakage L 502 and firing threshold TH 504, when they are represented as 2D matrices, the matrix size must match the size of neuron array of the current module, and each element of the matrix then applies to the corresponding neuron in the module. When they are represented as scalar, all of the neurons share the same value. For more discussions on D 506, refer to Section (4.4) below.

(4.2) Module Input Spike Buffers

Each SNN module 400 can have one or more sources of input spikes. For example, it can have inputs from multiple modules (e.g., 302, 304, 306, and/or 308). In particular, it can have one or more input sources representing the feedforward input, and another representing feedback (e.g., the connection from module2 306 to module1 304 in FIG. 3), and another for lateral inhibition 314, or combination of these sources. The input spikes can also have their own delay that is different for each source.

Figure 6:
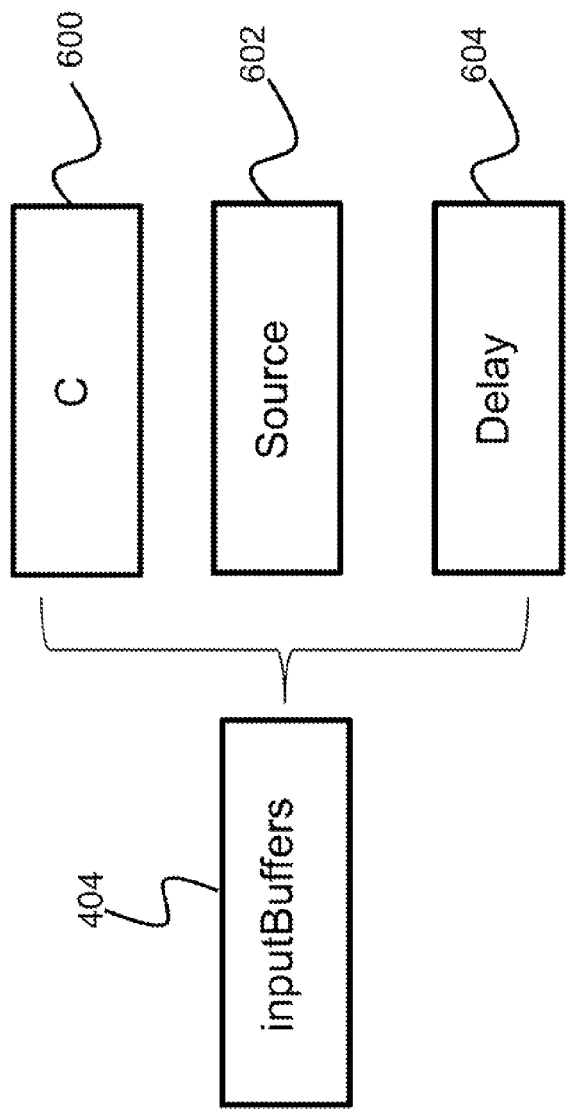
FIG. 6 is an illustration of a module inputBuffers structure according to the principles of the present invention.

FIG. 6 illustrates an inputBuffers 404 module. Each inputBuffers 404 element structure can have at least three fields: C 600 (a 2D matrix to store the input spikes from the source module), source 602 (the index of, or pointer to, the source module from which the input spikes come), and delay 604 (a scalar) indicating how many time steps the input spikes are to be delayed; a number that is used when spike propagation is handled). A more general implementation may specify an array of delays, one for each element in C 600. The size of C 600 matches that of the source module neuron array, which does not necessarily match the size of neuron array in the current module, because the destination neurons of the input spikes are specified by the connection matrix, as described below.

(4.3) Module Connection Matrices and Specialization

Each input spike buffer (i.e., inputBuffers 404) has its own connection matrix. A connection matrix serves two purposes. First, the connection matrix tells whether there is a (synaptic) connection between a neuron in the source module and one in the current module; second, if there is a connection, the synaptic weight that the neuron in the current module applies to the spike coming from the source neuron in updating its states. If there is no connection, the corresponding matrix element will take a value of 0. Since the connection matrix specifies both the connection and the weights (when there are connections), the terms connection matrix and connection weight matrix are used interchangeably. For a 2D image or video processing, both the source and the current module neurons are commonly arranged in 2D arrays. As a result, in its most general form, the connection weight matrix will be four dimensional (4D), with its first two dimensions indexing the neurons in the source module and its last two dimensions indexing the neurons in the current module. For example, when a source module has a size of M by N and a current module is P by Q, then the size of the full connection weight matrix will be M by N by P by Q. Each entry in the connection matrix 700, denoted by the indices (i,j,k,l), is either 0 (meaning there is no connection between neuron (i,j) in the source module and the neuron (k,l) in the current module), or a real value indicating the connection weight of the synapse from neuron (i,j) to neuron (k,l). In the case of convolution of filtering, a connection is determined by the receptive field of the neuron receiving the spikes. A positive weight indicates an excitatory connection, while a negative weight indicates an inhibitory connection.

While a connection matrix can represent any possible connection patterns between the source module neurons and those in the current module (since the connection matrix is a 4D matrix), it can be very inefficient for many common image processing tasks, such as convolution and filtering where the connection patterns are sparse, fixed and known a priori. For example, if a module performs a filtering operation on the input spikes from a source module using a filtering kernel, the connections from the source neurons to a specific neuron in the current module have the same local connection pattern (all within a certain small neighborhood of the neuron array, as non-limiting examples, anywhere from 3 by 3 to 10's by 10's or 100's by 100's depending on the image size) and weight distribution (following the given filtering kernel) no matter where that neuron is located in the neuron array in the current module. Therefore, according to the principles of the present invention, a specialized approach is provided for these common image processing tasks, in which the connection matrix is simply represented by the convolution or filtering kernel (a 2D matrix of convolution or filtering coefficients), and the actual connection matrix is never explicitly constructed, achieving significant savings in memory storage for large networks. This approach also allows the top-level simulation process (i.e., the simulation loop described in section (4.6.3)) to be transparent to a low level implementation (i.e., how the update operation is implemented, section (4.6.1)) as long as the low-level implementation handles how to route the input spikes according to the connections and weights specified by the kernel for the convolution or filtering. This is an important feature of the system described herein according to the principles of current invention.

Figure 7:
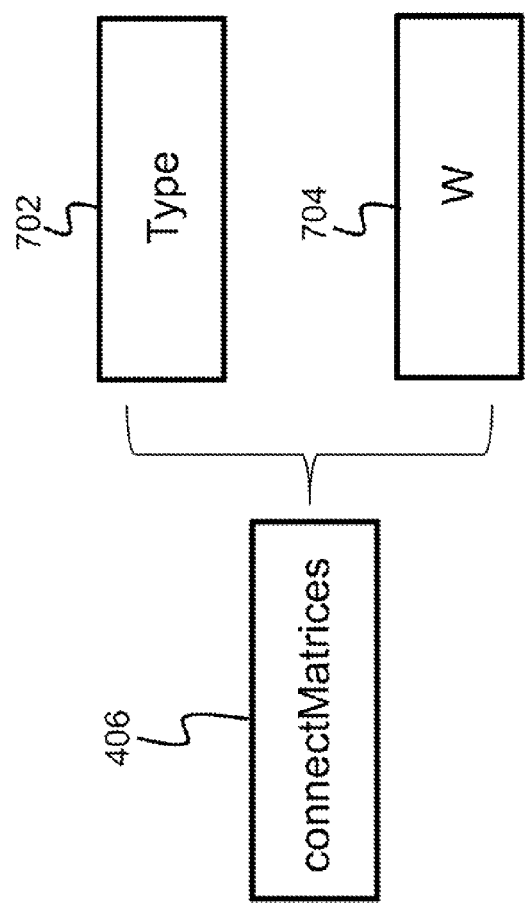
FIG. 7 is an illustration of a module connectMatrices structure according to the principles of the present invention.

More specifically, as depicted in FIG. 7, the connectMatrices 406 can be implemented as an array of structures, one for each input source, in which each element structure has two fields: type 702 and W 704. The type 702 field can have one of the values of, but not limited to, 'full', 'filter', 'convolution', 'scaling', and 'one', representing different specialized connection types. The field W 704 is the connection weight matrix, which has specific meaning associated with specialized connection types according to the following:

(a) When connection type 702 is 'full', W 704 is a 4D matrix of size M by N by P by Q, where M by N is the size of a neuron array of the source module, and P by Q is the size of neuron array of the current module; this is the most general form of the connection weight matrix for W;

(b) When connection type 702 is 'filter', W 704 is a 2D matrix that stores the filtering kernel;

(c) When connection type 702 is 'convolution', W 704 is the 2D matrix that stores the convolution kernel;

(d) When connection type 702 is 'scaling', W 704 is a 2D one-to-one scaling matrix or a scalar number that applies to all neurons in current module;

(e) When connection type 702 is 'one', W 704 equals 1. It is a special case of scaling with a scalar W=1.0 (listed here as a separate case for speeding up the computation).

In the above case (d), "one-to-one" means each spike in the corresponding input buffer 404 only feeds one neuron in the current module at the same location in the neuron array. Therefore, in this case, the size of the neuron array in the source module must match that in the current module. Non-limiting examples of how the specialized connection matrices are used in the neuron update step, and how they can be implemented as specialized method for these derived classes of connection matrix are described below.

(4.4) Module Output Spike Buffer

The module output spike buffer (i.e., outBuffer 408) can hold a certain history of output spikes in a FIFO (first-in-first-out) fashion. The length of the spike history is determined by parameter D 506 in module status 402 described above. D 506 represents the maximum axon delays for the spikes going out from this module. Different amounts of delays (up to D time steps) can be specified in the input spike buffer (inputBuffer 404) of the modules receiving the spikes from current module. These spikes can then be extracted by the receiving modules (including the current module itself in a recurrent network) as input spikes with the specified delays in the spike propagation step. Non-limiting examples of how the module output spike buffer (i.e., outBuffer 408) can be updated and how the spikes it stores can be delivered to the receiving modules are described below.

An alternative design is to store delayed spikes in input spike buffers of the modules receiving the spikes. However, since the output spikes of a module can be the input of more than one module, storing delayed spikes in the output spike buffer can save both memory and computation in general.

(4.5) Learning

Figure 8:
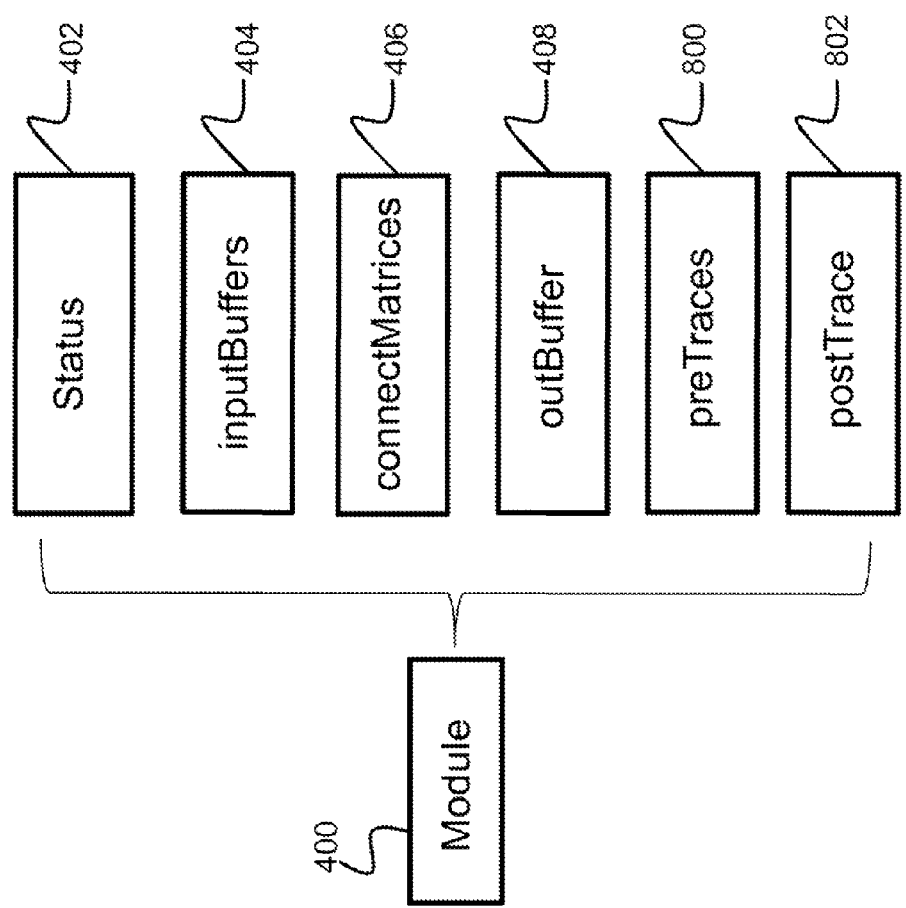
FIG. 8 is an illustration of an extended module structure with learning according to the principles of the present invention.

The data structure of the system according to the principles of the present invention can readily be extended to include various learning methods. Learning in a spiking neural network typically means changing of synaptic weights stored in connection matrices (connectMatrices 406) of each neuron, either increasing the weights or decreasing the weights. Learning is typically based on the input spike history (presynaptic) and output spike history (postsynaptic) of the neuron, and more importantly on the relative timing of input and output spikes. Therefore, these histories, called spike traces, are required for learning. Storage for presynaptic and postsynaptic traces can be added to the SNN module 400 as additional fields in the data structure: preTraces 800 and postTrace 802, as illustrated in FIG. 8. Then various learning methods, including spike-timing dependent plasticity (STDP) (with online implementation using traces) and Burst STDP, can be carried out within each module (i.e., no interaction or communication with other modules) entirely at each simulation time step. Refer to Literature Reference No. 2 for a description of STDP and Literature Reference Nos. 3 and 4 for a description of Burst STDP.

In an embodiment, the learning algorithm decides how to use the information saved in preTraces 800 and/or postTrace 802. The simulator constructs/provides the facility for such learning to happen. For example, in a STDP (spike-timing dependent plasticity) learning scheme, the learning algorithm may correlate the time histories of spikes coming into a neuron (that are kept in preTraces 800) and of the spikes coming out of the neuron (that are kept in postTrace 802) and determine if the synaptic strength of a particular synapse (among all the synapses of that neuron) should be raised (e.g., "potentiation") or lowered (e.g., "depression"). This makes a very desirable parallelized processing model for learning as well. Because learning affects the contents in the connection matrices (i.e., connectMatrices 406), learning will affect the network dynamics for subsequent simulation steps.

(4.6) Simulation Method

After creating a collection of inter-connected modules which describe the entire network structure, running a simulation involves two steps for each discrete time step of the simulation: a state update step and a spike propagation step. In the state update step, module status (e.g., membrane potentials) is updated according to the neuron model (e.g., Equation (1)), the values of the output spike buffer (i.e., outBuffer 408) are updated based on whether a corresponding neuron has fired, and the weights in the connection matrices (i.e., connectMatrices 406) are changed (only if learning is carried out). Typically, the simulation will be run for a number of step times required for the processing task defined by the designer, but no less than the number of layers in the network because it takes at least that many time steps for an input spike to be propagated to the output of a network. Input spikes should be provided to the modules receiving input from outside of the network directly at each time step.

In the spike propagation step, each of the input spike buffers (i.e., inputBuffers 404) of the current module in the simulation is assigned values from the output spike buffers (i.e., outBuffer 408) of source modules with proper axonal delays. Both the update and spike propagation steps can be parallelized, though the spike propagation step involves inter-module communications. The module update step does all of the computation within each module and can, hence, be performed independently for each module. This "coarse" granularity of parallelization is ideal in a symmetric multi-processing (SMP) or a cluster environment.

(4.6.1) Module Update Function

The module update function involves the following steps as non-limiting examples:

For each module:

1) Update the neuron membrane potential by doing integration (e.g., for leaky integrate-and-fire (LIF) neurons, Equation (1));

2) Decide if each neuron should fire and, if so, update the corresponding output spike buffer (outBuffer 408) element and reset the membrane potential; and 3) Perform learning according to the desired learning rules, if applicable (e.g., STDP, Burst STDP).

For example, consider the leaky integrate-and-fire equation in Equation (1). The following is a non-limiting example of pseudo codes (in MATLAB-like syntax) for module update function, where convolution( ) and filter( ) are normal convolution and filtering operations in image processing, and variables without subscripts are matrices and, hence, require normal matrix operations. Note that the following pseudo code makes the assumption that the underlying module structure is as defined above (especially in (4.3) Module Connection Matrices and Specialization), so that the computation can be achieved with efficiency.

function snn_update(module)

% carry out one update step for the neurons in the given module

```
V=module.status.V;
L=module.status.A;
TH=module.status.TH;
D=module.status.D;
F=0;
% loop through each input spike buffer, and add up all the
input spikes
for k=1 up to length(module.inputBuffers)
    A(k)=module.inputBuffers(k).A;
    W(k)=module.connectMatrice(k).W;
    type(k)=module.connectMatrices(k).type;
    switch (type(k))
    case 'full'
    for all i and j
```

$$V_{ij}=V_{ij}+\Sigma_{pq}A(k)_{pq}*W(k)_{pqij};$$

```
    end for
        case 'convolution'
    V=V+convolution(W(k), A(k)); % do normal convolution
        case 'filter'
    V=V+filter(W(k), A(k)); % do normal filtering
    case 'scaling'
    for all i and j
```

$$V_{ij}=V_{ij}+A(k)_{ij}*W(k)_{ij};$$

```
    end for
        case 'one'
    V=V+A(k);
    ... % add cases if applicable
    end switch
end for
V=V+L;
% decide if the neurons in the module should fire
for all i and j
    if V_{ij}≥TH_{ij} then
        V_{ij}=0;
        F_{ij}=1;
    end if
end for
% Push the output spike F into the FIFO, outBuffer
for s=D down to 2
    module.outBuffer{s}=module.outBuffer{s-1};
end for
module.outBuffer{1}=F;
% perform learning if applicable
update module.preTraces and module.postTrace;
update module.connectMatrices.W according to the learning
rules such as STDP
```

(4.6.2) Spike Propagation Function

A spike propagation step sends spikes from source modules to receiving modules after an update cycle. Assume that "Modules" is the array of all of the modules, and each module is referenced by its index in the array. The spike propagation function can be defined using the following pseudo code:

```
function snn_propagate_spikes(Modules)
% The following loop can be done in parallel
for all module in Modules
    for i=1 up to length(module.inputBuffers)
        s=module.inputBuffers(i).source
        d=module.inputBuffers(i).delay
        module.inputBuffers(i).A=Modules(s)
            .outputBuffer{d};
    end for
end for
```

Here, the field 'source' is used in the module's inputBuffers 404 to find the source module (and its outBuffer 408) for each input spike buffer, and then the field 'delay' is used to extract the specific set of spikes stored in the outBuffer 408 of the source module. The 'delay' (delay 604) stored with the input buffer inputBuffers 404 receiving the spikes is used to index into the outBuffer 408 of the source module so that the output spikes with desired delay are retrieved. The default delay is 1 (i.e., the receiving buffer gets the spikes produced by the source module in the previous time step).

The spike propagation processing outlined in the pseudo code above "assigns" the source spikes to the receiving spike input buffer. In an implementation using modern programming languages, such as C/C++, this can be done through assignment of pointers, making the propagation very efficient. In case a single source module provides spikes to more than one receiving module, all of the receiving modules can share the same source module spike output buffer by pointing to the source. In the case when the source output buffer and the receiving modules are not located on the same computer environment (such as in different nodes on a computer cluster), the spikes in the source output buffer (i.e., outBuffer 408) may need to be copied to the receiving module's input buffer (i.e., inputBuffers 404). A node may be one or more CPUs physically located on the same printed circuit board or otherwise operated/controlled by a single operating system instance.

Even in this situation, the present invention offers advantages over traditional neuron-based simulation approaches. In a neuron-based design, the spikes produced by each neuron must be handled separately, incurring transmission overhead on the order of the number synapses. In the system according to the principles of the present invention, the overhead is incurred for each connection between two modules, which is typically orders of magnitude lower than the number of synapses in the system. Furthermore, if two modules of the system are allocated to a single computer node and they both receive spikes from the same source module, the two modules can share the same pool of spikes on the computer node, saving both memory and communication overhead. No matter in what computing environment, the outer loop of the pseudo code can be carried out in parallel resulting in efficient execution of the simulation.

Moreover, the pseudo codes provided above are illustrative examples for simplicity. The actual implementation details can be different. For instance, the module outBuffer 408 that stores delayed spikes can also be implemented as a circular array. Then, no shifting is ever needed for updating the outBuffer 408 in the snn_update function. This will save computation time when long delays exist. Furthermore, when spikes are sparse, the matrices in the inputBuffers 404 and outBuffer 408 are sparse matrices. Therefore, sparse matrix technologies can be used for storage and computation. For example, only non-zero elements (spikes) in these matrices have to be stored and propagated. This will reduce inter-module communications in a snn_propagate_spikes function in a parallelized processing environment. Also, because elements of these matrices only have a value 0 (no spikes) or 1 (spikes), better computation technology, other than simple multiplication and addition, may be sought and used.

Finally, note that a complete simulation of an image/computer vision system will usually involve one or more input modules which generate spikes from the image content. Such modules are called "dummy" modules because they receive no input other than the images. The module update and spike propagation functions according to the principles of the present invention need not be performed on the "dummy" modules, but their output spike buffer should be updated according to the image contents for each iteration in the simulation.

Figure 9:
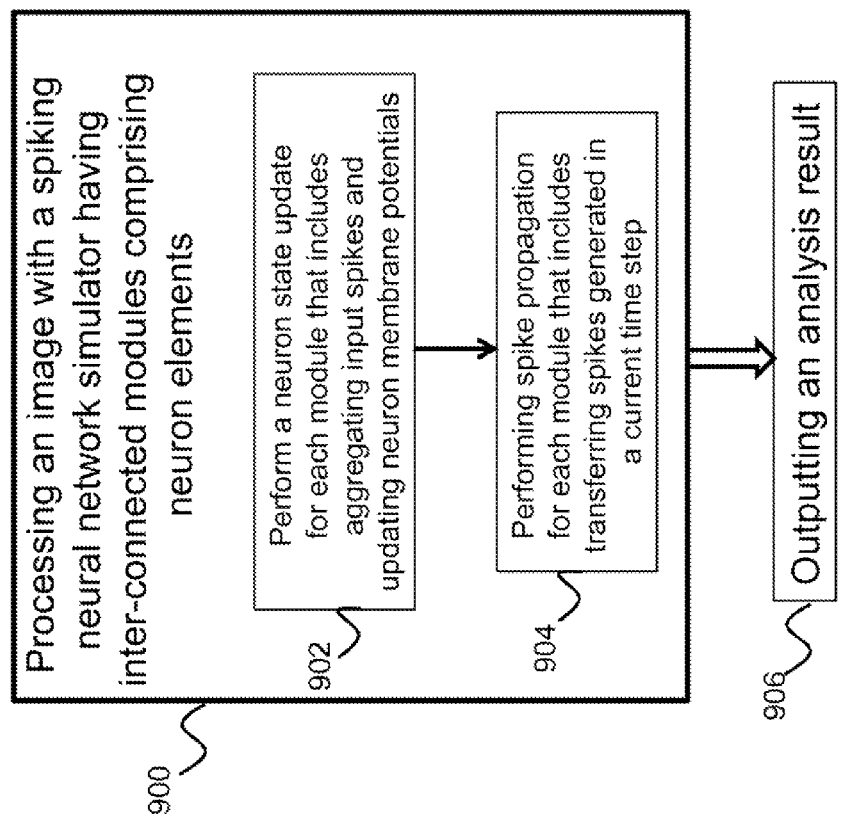
FIG. 9 is a flow diagram illustrating a spiking neural network simulator for image and video processing according to the principles of the present invention.

FIG. 9 is a flow diagram illustrating the system according to the principles of the present invention. As described above, in a first operation 900, an image is process with a spiking neural network simulator having inter-connected modules comprising neuron elements. To do this, a first sub-operation 902 involves performing a neuron state update for each module which includes aggregating input spikes and updating neuron membrane potentials. In a second sub-operation 904, the system performs spike propagation for each module which includes transferring spikes generated in a current time step. In a second operation 906, an analysis result is output.

(4.6.3) Simulation

In running simulations, first an array of "Modules" with all modules defined according to the entire network structure is created. Then, connections are established between modules in the array "Modules". Finally, the simulation is performed as follows:

function update_and_propagate(Modules)
snn_propagate_spikes(Modules);
for module in Modules
   snn_update(module));
end for As with the pseudo code for spike propagation described above, the snn_update( ) function call inside the loop "for module in Modules" in the above pseudo code can be carried out in parallel, resulting in efficient execution of simulation task. Note also that in the above pseudo code, the spike propagation step is put before the neuron state update step as opposed to the other way around. However, in practice, this does not make a difference as long as the state update and the spike propagation steps are executed one after another in a single time step.

Figure 10:
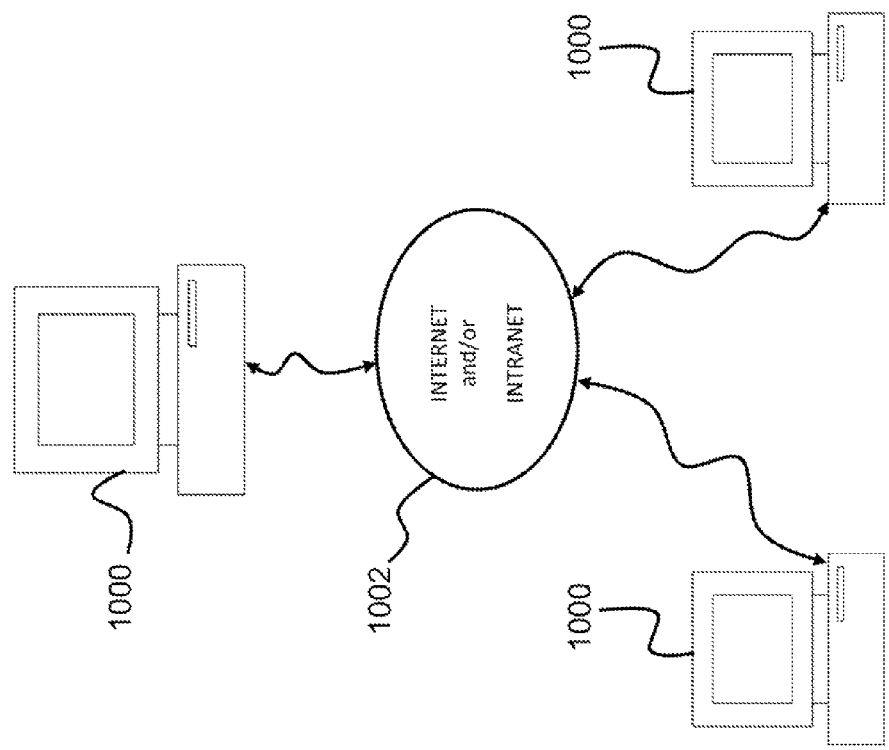
FIG. 10 illustrates networked computers according to the principles of the present invention.

FIG. 10 depicts a group of networked computers 1000. A computer network allows computers 1000 to exchange data via data connections (i.e., network links). The computers 1000 are linked and communicate via cable media or wireless media, such as via internet and/or intranet 1002. The system according to the principles of the present invention is defined as a collection of inter-connected modules. For a very large network simulation, one can have the network broken down into groups of modules with each group hosted on a single processor node across a cluster of computers 1000.

What is claimed is:

1. A system for simulating spiking neural networks for video and image processing, the system comprising:
   one or more processors and a non-transitory computer-readable medium having executable instructions encoded thereon such that when executed, the one or more processors perform operations of:
     processing an image with a spiking neural network simulator having a plurality of inter-connected modules, each module comprising a plurality of neuron elements and implemented within one or more spiking neural network hardware chips, wherein processing the image further comprises:
       performing a neuron state update for each module that includes aggregating input spikes and updating neuron membrane potentials; and
       performing spike propagation for each module that includes transferring spikes generated in a current time step; and
     outputting an analysis result,
     wherein at least one buffer is associated with each module, and the spike propagation comprises updating the at least one buffer of a current module using the at least one buffer of a source module.

2. The system as set forth in claim 1, wherein processing the image comprises:
   based on a type of a task to be performed on the image, determining whether to perform the processing using one of a matrix having at least four dimensions and a matrix having two or less dimensions; and
   performing the task on the image using one of the matrix having at least four dimensions and the matrix having two or less dimensions.

3. The system as set forth in claim 2, wherein the matrix having at least four dimensions denotes synaptic connections and weights between a plurality of neuron elements of a source module and a current module in the plurality of inter-connected modules.

4. The system as set forth in claim 2, wherein the matrix having two or less dimensions is configured to perform a convolution.

5. The system as set forth in claim 3, wherein processing the image further comprises changing the weights for the matrix having at least four dimensions of at least one of the modules when learning occurs.

6. The system as set forth in claim 1, wherein the spike propagation steps between modules located on the same computer environment are performed by assigning pointers.

7. A computer-implemented method for simulating spiking neural networks for video and image processing, comprising an act of:
   causing a data processor to execute instructions stored on a non-transitory memory such that upon execution, the data processor performs operations of:
     processing an image with a spiking neural network simulator having a plurality of inter-connected modules, each module comprising a plurality of neuron elements and implemented within one or more spiking neural network hardware chips, wherein processing the image further comprises:
       performing a neuron state update for each module that includes aggregating input spikes and updating neuron membrane potentials; and
       performing spike propagation for each module that includes transferring spikes generated in a current time step; and
   outputting an analysis result,
   wherein at least one buffer is associated with each module, and the spike propagation comprises updating the at least one buffer of a current module using the at least one buffer of a source module.

8. The method as set forth in claim 7, wherein processing the image comprises:
   based on a type of a task to be performed on the image, determining whether to perform the processing using one of a matrix having at least four dimensions and a matrix having two or less dimensions; and
   performing the task on the image using one of the matrix having at least four dimensions and the matrix having two or less dimensions.

9. The method as set forth in claim 8, wherein the matrix having at least four dimensions denotes synaptic connections and weights between a plurality of neuron elements of a source module and a current module in the plurality of inter-connected modules.

10. The method as set forth in claim 8, wherein the matrix having two or less dimensions is configured to perform a convolution.

11. The method as set forth in claim 9, wherein processing the image further comprises changing the weights for the matrix having at least four dimensions of at least one of the modules when learning occurs.

12. The method as set forth in claim 7, wherein the spike propagation steps between modules located on the same computer environment are performed by assigning pointers.

13. A computer program product for simulating spiking neural networks for video and image processing, the computer program product comprising:
   computer-readable instructions stored on a non-transitory computer-readable medium that are executable by a computer having a processor for causing the processor to perform operations of:
   processing an image with a spiking neural network simulator having a plurality of inter-connected modules, each module comprising a plurality of neuron elements and implemented within one or more spiking neural network hardware chips, wherein processing the image further comprises:
      performing a neuron state update for each module that includes aggregating input spikes and updating neuron membrane potentials; and
      performing spike propagation for each module that includes transferring spikes generated in a current time step; and
   outputting an analysis result,
   wherein at least one buffer is associated with each module, and the spike propagation comprises updating the at least one buffer of a current module using the at least one buffer of a source module.

14. The computer program product as set forth in claim 13, wherein processing the image comprises:
   based on a type of a task to be performed on the image, determining whether to perform the processing using one of a matrix having at least four dimensions and a matrix having two or less dimensions; and
   performing the task on the image using one of the matrix having at least four dimensions and the matrix having two or less dimensions.

15. The computer program product as set forth in claim 14, wherein the matrix having at least four dimensions denotes synaptic connections and weights between a plurality of neuron elements of a source module and a current module in the plurality of inter-connected modules.

16. The computer program product as set forth in claim 14, wherein the matrix having two or less dimensions is configured to perform a convolution.

17. The computer program product as set forth in claim 15, wherein processing the image further comprises changing the weights for the matrix having at least four dimensions of at least one of the modules when learning occurs.

18. The computer program product as set forth in claim 13, wherein the spike propagation steps between modules located on the same computer environment are performed by assigning pointers.

19. The system as set forth in claim 1, wherein each module comprises an input layer, one or more middle layers, and an output layer.

20. The method as set forth in claim 7, wherein each module comprises an input layer, one or more middle layers, and an output layer.

21. The method as set forth in claim 13, wherein each module comprises an input layer, one or more middle layers, and an output layer.

* * * * *